(No Model.) 2 Sheets—Sheet 2.

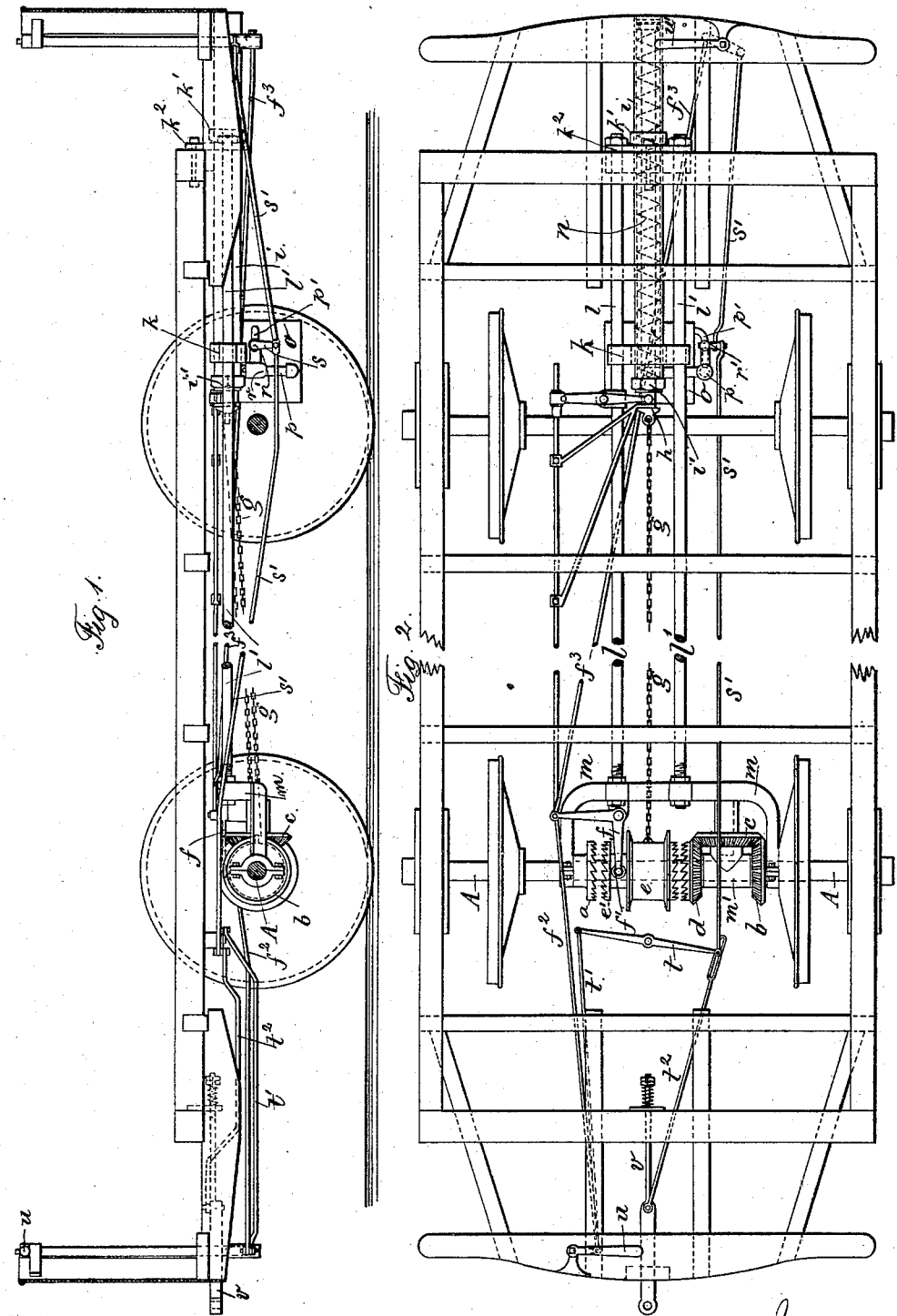

C. E. DAVISON.
CAR BRAKE AND STARTER.

No. 270,286. Patented Jan. 9, 1883.

Witnesses:
J. Haib
Chas H. Smith

Inventor:
Charles Edward Davison
per Lemuel W. Serrell
Atty.

UNITED STATES PATENT OFFICE.

CHARLES E. DAVISON, OF LONDON, ENGLAND.

CAR BRAKE AND STARTER.

SPECIFICATION forming part of Letters Patent No. 270,286, dated January 9, 1883.

Application filed November 11, 1882. (No model.) Patented in England November 11, 1881, No. 4,938, and in France July 21, 1882, No. 138,043.

*To all whom it may concern:*

Be it known that I, CHARLES E. DAVISON, of 80 Redcliffe Square, London, England, have invented a new and useful Improvement in Apparatus for Stopping and Starting Cars; and the following is declared to be a full and exact description of the same.

Letters Patent for this invention were granted to me in England November 11, 1881, No. 4,938, and in France July 21, 1882, No. 138,043.

In starting tramway-cars drawn by horses there is a great strain upon the animals until the car is under way. In starting railway-cars, especially upon an up-grade, there is a great strain upon the mechanism of the locomotive, and numerous devices have been made to remove these strains and to store up the power of stopping the cars, so that the same might be utilized in starting again.

My invention relates essentially to a device employing the compression of a spring to stop the car and the expansion of said spring to start the car again. This spring is combined with a cylindrical tube and a piston rod and head, moved by a chain or wire rope, which is wound upon a drum by the revolution of the wheels and axle upon which the said drum is secured. Upon the same axle I place engaging and disengaging clutches operated by levers under the control of the driver, and I employ oil or similar liquid to act on the piston and retain the spring in its compressed condition while the car is at rest, and the oil is allowed to pass out of the cylinder into a holder upon the starting of the car, as hereinafter described.

Figure 4:
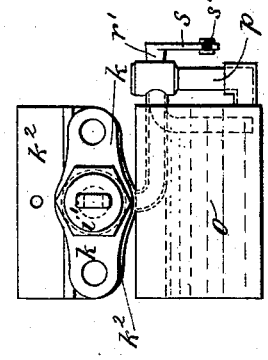
Figure 3:
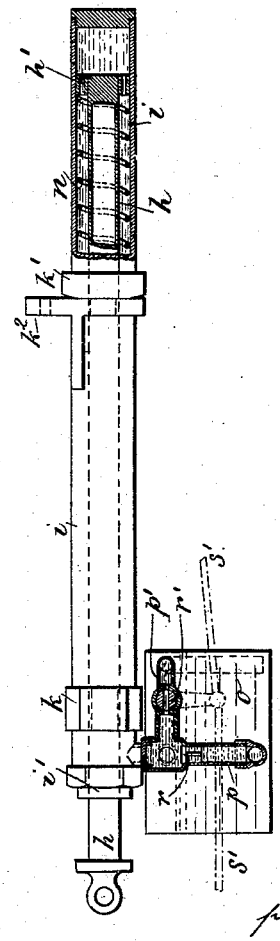

In the drawings, Figure 1 is a side view of the frame-work of a car with my device attached, the wheel and boxes on one side being removed. Fig. 2 is a plan of the same. Fig. 3 is a sectional view of the cylinder, piston-rod spring, and oil-vessel in larger size; and Fig. 4 is an end view of the same.

The frame-work of the car, the wheels, and their axles and journal-boxes are of any usual construction.

Upon one of the car-axles A, I place a clutch-wheel, *a*, and securely key the same to the axle. This wheel has upon its inner face inclined radial teeth. Upon the same axle I secure the beveled toothed wheel *b*. This gears with the wheel *c*, and it in turn gears with the beveled-toothed wheel *d*, that is loose upon the shaft or axle A. The wheel *c* is carried by a frame hereinafter described. The wheel *d* has clutch-teeth on its side similar to those on *a* standing in the reverse direction.

Between *a* and *d*, I place the cylinder or drum *e*, with raised rim or edge, and having clutch-teeth upon the side next to *d* made similar to the teeth on *d* and capable of meshing with them. Upon the other side of the drum there is a collar surrounding the axle and a disk, *e′*, which disk has clutch-teeth upon its side similar to those on *a*, and capable of meshing with them, and there is a groove formed between the disk *e′* and drum *e*, in which the operating-lever *f* and its roller *f′* work. This drum *e* is free to slide sidewise and turn upon the shaft A, and there is a chain or wire rope, *g*, secured to it at one end and to the piston-rod *h* at the other end. This piston-rod *h* and its piston *h′* are surrounded by the cylinder *i*, and the rod works through a stuffing-box, *i′*, on one end of said cylinder, the other end being closed. The cylinder *i* is secured in and supported by the bands or collars *k k′*, that surround it, by the angle-iron heading *k²*, that bears against and is secured to the floor-beams of the car and by the rods *l l′*, that pass through eyes in the collars *k k′* at the sides of the cylinder, and these rods *l l′* are continued forward and bolted to U-shaped frame *m*, and the ends of this frame are made as rings or collars surrounding the axle A.

Between the ends of the U-shaped frame *m*, upon the axle A, are the aforesaid toothed clutches, bevel-wheels, and drum, that are actuated in compressing and releasing the spring *n*, through the medium of the piston-rod *h* and wire rope or chain *g*.

Between the frame *m* and the axle A there is a gudgeon, *m′*, having an eye through which the axle A passes, and this gudgeon supports the bevel-wheel *c*, and the eye-collar at the end of the gudgeon serves to keep the bevel-wheels *d* and *b* apart.

The piston-rod *h* is provided with a cupleather in the piston-head $h'$, or an oil-tight gland or stuffing-box, where it enters the cylinder, and I provide a tank or receptacle, $o$, for oil or similar liquid, and a stand-pipe, $p$, and a horizontal pipe, $p'$, connected to the same. The stand-pipe $p$ has an automatic valve, $r$, that opens upwardly, and the horizontal pipe $p'$ has a cock, $r'$, that is operated by the crank-arm $s$ and rods $s'$, and this arm and rods are under the control of the horses' pull-gear, and by the driver.

The lever-arm $f$ is L-shaped, and it is pivoted at the center to the frame $m$. One end of this arm has the roller $f'$, that runs in the groove in the drum $e$, and the other end has attached to it the rods $f^2 f^3$, connected to the levers at the respective ends of the car. The jointed lever $t$ is attached to the under side of the car, and to one end of said lever is attached the rod $t'$, and to the other end the rods $t^2$ and $s'$. The rods $f^2$ and $t'$ are connected to a lever upon a vertical rod, with a handle, $u$, which is operated by the driver on one end of the car, while the rods $f^3$ and $s'$ are connected with a lever attached to the rod and handle $u'$ on the back of the car, which is under the control of the conductor or driver, if the car is going the other way. The rod $t^2$ is attached to the draw-bar $v$ of the car, and is operated when the horses start the car. This may be dispensed with, if desired, as the other devices alone will operate the apparatus.

The operation of the parts is as follows: To stop a car the driver pulls the lever-handle by his side toward him in the opposite direction to that in which the car is moving. This gears the cylinder or drum $e$ to either toothed wheel $a$ or $d$, according to direction in which the car is going, and at the same time shuts the valve $r'$. These wheels $a$ or $d$, being driven by the motion of the car-wheels, wind up the chain or wire rope $g$ upon the drum $e$. This pulls after it the piston-rod $h$ and piston $h'$ in the cylinder $i$ and compresses the spring $n$. The movement of the piston-rod and its head $h'$ creates a particular vacuum behind said head, drawing in the oil from the tank or receptacle $o$ through the stand-pipe $p$ past the valve $r$. The momentum of the car being eventually overcome by the action of the spring, the car is brought to a standstill. The spring now acts upon the piston $h'$, pressing it back. This pressure shuts the valve $r$, and the confined oil retains the piston, piston-head, and spring in a stationary position. The vehicle now remains stationary so long as necessary. To start the car the driver pushes the lever-handle $u$ or $u'$ away from him. This moves the rod $f^2$ or $f^3$ and lever $f$, engaging the teeth on the cylinder or drum $e$ with the other wheel, $a$ or $d$, as the case may be. This adjusts the driving-wheels for the onward or forward action, so that when the rod $t'$ is moved it moves the lever $t$, rods $s'$, and crank-arm $s$, opening the valve or cock $r'$ in the horizontal pipe $p$. This relieves the pressure upon the piston-head $h'$ and allows the oil to flow back into the receptacle $o$, as the spring expands and pushes the piston-rod and head back. The spring thus expanding draws the piston-rod into the cylinder, unwinds the chain or wire rope, revolving the drum on axle A and the car-wheels, and starting the car.

The opening of the valve or cock $r'$ may be accomplished by the starting of the horses through the medium of the draw-bar $v$, rod $t^2$, lever $t$, rods $s'$, and crank-arm $s$, instead of by the driver, as heretofore described.

The oil receiver or tank $o$ is made of a capacity greater than the cylinder $i$, so that there is provided an ample supply of oil.

The cylinder, piston, spring, and oil-tank instead of being used singly, as shown and described, may be doubled, using two.

I may prefer to employ some other liquid instead of oil, and I do not limit myself in this particular.

I can use compressed air in place of the spring as a medium for providing the elastic power or force, retaining all the rest of the mechanism, as heretofore described.

I claim as my invention—

1. In a device for stopping and starting cars, the combination, with the bevel and clutch wheels $a\ b\ c\ d$, the drum $e$, the chain or wire rope $g$, and means for engaging and disengaging the clutches, of the cylinder $i$, piston-rod $h$, spring $n$, and oil tank or receptacle $o$, and pipes $p\ p'$, leading into the cylinder $i$, substantially as set forth.

2. In a device for stopping and starting cars, the combination, with the cylinder $i$, piston-rod $h$, spring $n$, wire rope or chain $g$, and mechanism, substantially as specified, for moving the same, of the oil tank or receptacle $o$, pipes $p\ p'$, and valves or cocks $r\ r'$, and mechanism for operating the same, substantially as set forth.

3. In an apparatus for stopping and starting cars, the combination, with the bevel-gear, clutch-wheels, and drum, of the chain or wire rope $g$, cylinder, piston, and spring, and the connections to the brake, and draw-bar $v$, substantially as specified, whereby the accumulated power in stopping is availed of in starting either automatically by the pull of the horses or by hand, substantially as specified.

Signed by me this 18th day of October, A. D. 1882.

C. E. DAVISON.

Witnesses:
Js. EDW. BEESLEY,
S. S. PURRY,
*Both of 2 Pope's Head Alley, Cornhill, London, Gentlemen.*